United States Patent

He et al.

[11] Patent Number: 5,963,327
[45] Date of Patent: *Oct. 5, 1999

[54] TOTAL INTERNAL REFLECTION ELECTROMAGNETIC RADIATION BEAM ENTRY TO, AND EXIT FROM, ELLIPSOMETER, POLARIMETER, REFLECTOMETER AND THE LIKE SYSTEMS

[75] Inventors: Ping He; Blaine D. Johs; Craig M. Herzinger, all of Lincoln, Nebr.

[73] Assignee: J.A. Woollam Co. Inc., Lincoln, Nebr.

[ * ] Notice: This patent is subject to a terminal disclaimer.

[21] Appl. No.: 09/033,694

[22] Filed: Mar. 3, 1998

[51] Int. Cl.$^6$ .................................................. G01J 4/00
[52] U.S. Cl. ........................................... 356/369; 250/225
[58] Field of Search ..................... 356/364, 365, 356/366, 367, 368, 369; 250/225

[56] References Cited

U.S. PATENT DOCUMENTS

| H230 | 3/1987 | Smith | 356/364 |
|---|---|---|---|
| 3,874,797 | 4/1975 | Hasai | 356/118 |
| 4,381,151 | 4/1983 | Smith | 356/369 |
| 4,681,450 | 7/1987 | Affam | 356/367 |
| 4,801,798 | 1/1989 | Lange | 250/225 |
| 5,209,813 | 5/1993 | Oshida et al. | 356/364 |
| 5,229,833 | 7/1993 | Stewart | 356/364 |
| 5,337,146 | 8/1994 | Affam | 356/367 |
| 5,373,359 | 12/1994 | Woollam et al. | 356/328 |
| 5,416,588 | 5/1995 | Ducharme et al. | 356/369 |
| 5,504,582 | 4/1996 | Johs et al. | 356/369 |
| 5,521,706 | 5/1996 | Green et al. | 356/369 |

OTHER PUBLICATIONS

"Division of Amplitude Photopolarimeter Based upon conical Diffraction For a Metallic Grating", Azzam, App. Op., vol. 31, No. 19, Jul. 1992.

Primary Examiner—Hoa Q. Pham
Attorney, Agent, or Firm—James D. Welch

[57] ABSTRACT

Disclosed are laterally compact ellipsometer, polarimeter, reflectometer and the like material system investigating systems, and methods for their use. Input and output optical elements effect changes in orientation, (propagation direction), of a beam of electromagnetic radiation caused to pass therethrough by an essentially total internal reflection therein. In addition, a propagation direction diverted beam of electromagnetic radiation can be simultaneously, optionally, caused to have a phase retardation entered between orthogonal polarization components thereof by at least one of the input and output optical elements. The present invention enables relatively simple investigation of a sample system with a polarized beam of electromagnetic radiation which impinges thereupon at a less than Brewster Angle, small "spot" size effecting angle-of-incidence, with respect to a normal to a surface of an investigated material system.

19 Claims, 5 Drawing Sheets

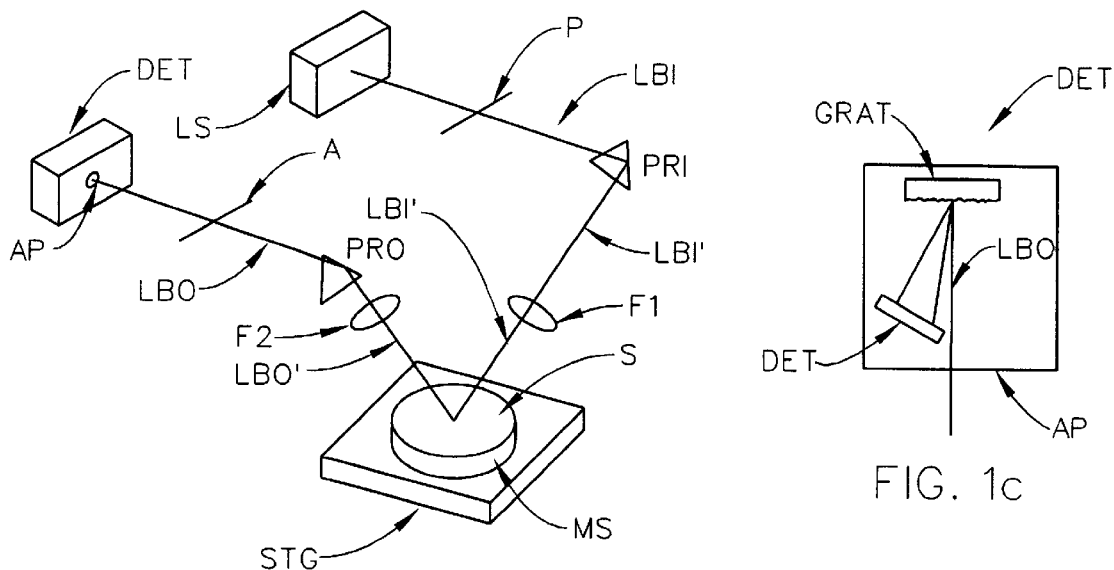
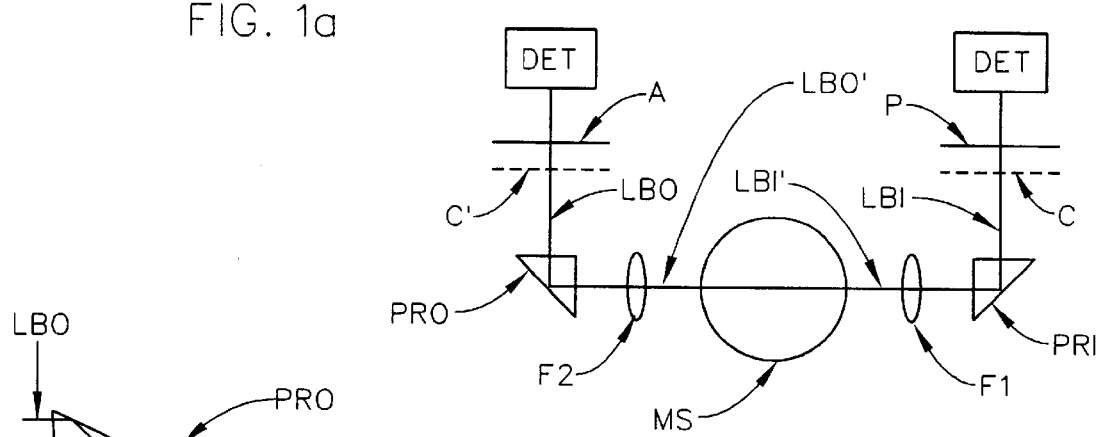
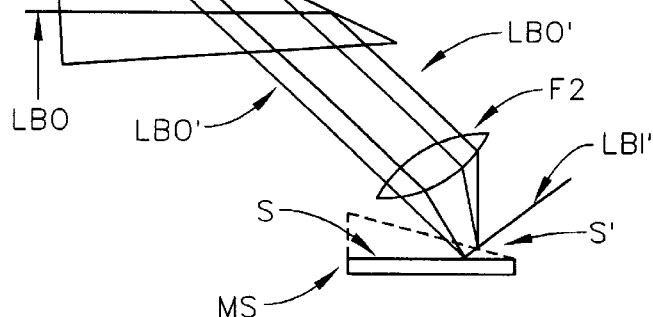
FIG. 1a
FIG. 1c
FIG. 2
FIG. 1b

TOTAL INTERNAL REFLECTION ELECTROMAGNETIC RADIATION BEAM ENTRY TO, AND EXIT FROM, ELLIPSOMETER, POLARIMETER, REFLECTOMETER AND THE LIKE SYSTEMS

TECHNICAL FIELD

The present invention relates to ellipsometer, polarimeter and reflectometer and the like systems. More particularly, the present invention is a material system investigating system, and method of use thereof, comprising input and output optical elements, each of which input and output optical elements effects a change in orientation, (ie. propagation direction), of a generally horizontally (vertically) oriented beam of electromagnetic radiation by an essentially total internal reflection therein of, typically, ninety (90) degrees, to a generally vertically (horizontally) oriented beam of electromagnetic radiation. In addition, a diverted beam of electromagnetic radiation can be, optionally, caused to have a phase retardation entered between orthogonal polarization components thereof by an essentially totally internal reflection of at least one of said input and output optical elements.

BACKGROUND

Ellipsometer, Polarimeter, Reflectometer and the like systems, allow determination of Sample System physical and optical properties, (such as thickness, refractive index and extinction coefficient of surface films thereon), by detecting change in "Polarization State" and/or Intensity of a beam of polarized light which is caused to interact with said Sample System, where Polarization State here refers to a set of values for Polarized Light Beam Orthogonal Components, (such as "S" and "P"), Magnitude Ratio, and a Phase Angle therebetween. (It is noted that "P" refers to that component which is in a plane containing the normal to a Sample System and incident and/or transmitted beam(s) of polarized light, and "S" refers to that component perpendicular thereto and parallel to the surface of said Sample System. It is also noted that a "full" polarization state also requires designation of an absolute value to which a magnitude ratio is referenced, and the direction of rotation of a polarized beam of light).

Ellipsometer Systems generally can be broadly classified as:

1. Rotatable Element or Intensity Modulating Rotating Element Ellipsometers (REE); and
2. Phase Modulating Modulation Element Ellipsometers (MEE).

An example, for instance, is presented in a patent to Woollam et al., U.S. Pat. No. 5,373,359, which describes a Rotating Analyzer Ellipsometer (RAE) in which a Light Source provided beam of light is caused to pass through a Polarizer, (which serves to set a Polarization State therein), then interact with a Sample System. Said interaction with said Sample System serves to alter the Polarization State of said polarized beam of light, which polarized beam of light then sequentially encounters a Rotating Analyzer and a Dispersion Optics, (eg. a Diffraction Grating is specified), which forms therefrom a multiplicity of essentially single wavelength polarized beams of light. Said multiplicity of essentially single wavelength polarized beams of light are then caused to enter a Photo Detector Array, in which Photo Detector Array, individual Detector Elements serve to develop a representative signal for each. Fourier Analysis, for instance, of said signals allows determination of parameters which allow determination of Sample System characterizing PSI and DELTA values. It is noted that in said Woollam et al. (RAE) there is no additional focusing applied after the polarized beam of light encounters the Sample System. Additional patents to Johs et al. and Green et al., U.S. Pat. Nos. 5,504,582 and 5,521,706 respectively provide further insight into rotating analyzer ellipsometer systems.

Another patent, U.S. Pat. No. 5,416,588 to Ducharme et al., describes a Modulation Element Ellipsometer (MEE) comprised of a Light Source, a Polarizer, a Polarization State Modulator Element, a means for splitting Orthogonal Components in a Beam of Polarized Light after interaction with a Sample System, two Detector Elements and an Analysis System. In use a beam of light is provided by the Light Source and a state of Polarization is set therein by said Polarizer, after which the polarized beam of light is subjected to a Polarization State Modulation and caused to interact with a Sample System, which Sample System changes the State of Polarization of said Phase Modulated Polarized beam of light. Orthogonal Components of said Polarized beam of Light are then isolated and subjected to separate, for instance, Fourier Analysis. Appropriate utilization of the Coefficients of the terms of a Fourier Series allows determination of Sample System characterizing PSI and DELTA values. It is noted the described Modulation Element Ellipsometer (MEE) utilizes Coefficients from Fourier Series based upon both Orthogonal Components. Some Modulation Ellipsometers utilize Fourier Series Coefficients from only one such Orthogonal Component. While the specifics of signal generation are different in (REE) and (MEE) ellipsometers, and even amongst Ellipsometers of similar type, the end result of utilization thereof is provision of PSI and DELTA values for Sample Systems analyzed therein.

In the above the terms Polarizer and Analyzer were utilized, and it is to be understood that said elements can be essentially similar and are identified primarily by location in an Ellipsometer or Polarimeter and the like system. Polarizers are positioned ahead of a Sample System, and Analyzers thereafter. As well, Compensators can be present, for instance, between Polarizers and Analyzers, and after Analyzers. Compensators generally operate to change a phase angle between orthogonal components of a polarized beam of light, via a birefringence property which serves to retard one orthogonal component differently than the other. Polarizers, Analyzers and Compensators can be Rotatable, Rotating and Stationary in use.

Numerous other Ellipsometer Systems could be described, which are, for instance, comprised of various combinations of:

Stationary Polarizer(s);
Stationary Compensator(s);
Stationary Analyzer(s);
Rotatable Polarizer(s);
Rotatable Compensator(s);
Rotatable Analyzer(s);
Rotating Polarizer(s);
Rotating Compensator(s);
Rotating Analyzer(s);
Modulator Element(s).

Examples of Ellipsometers to which the present invention system and method of application can be applied are, for instance:

a. Rotatable Element Nulling Ellipsometers (RENE);

b. Rotatable Element Automated Nulling Ellipsometers (REANE);
c. Modulation Element Ellipsometers (MEE);
d. Rotating Analyzer Ellipsometers (RAE);
e. Rotating Polarizer Ellipsometers (RPE);
f. Rotating Compensator Ellipsometers (RCE);
g. Rotating Polarizer and Analyzer Ellipsometers (RPAE);
h. Rotating Polarizer and Analyzer, Fixed Compensator (RPAFCE);
i. Rotating Analyzer and Compensator, Fixed Polarizer Ellipsometer (RACFPE);
j. Rotating Polarizer and Compensator, Fixed Analyzer (RPCFAE);
k. Rotating Analyzer, Fixed Polarizer and Compensator Ellipsometer (RAFPCE);
l. Rotating Polarizer, Fixed Analyzer and Compensator Ellipsometer (RPFACE);
m. Rotating Compensator, Fixed Analyzer and Polarizer Ellipsometer (RCFAPE);

(Note that similar identifying descriptions also apply to Polarimeter and the like Systems).

For the purposes of the present invention it is not necessary to describe each above listed system in detail, however.

The present invention, can be applied to essentially any ellipsometer or polarimeter or reflectometer and the like system, and is focused upon providing a solution to a problem in use of reflectometers, ellipsometers, polarimeters and functionally similar sample analysis systems, which presents when a sample system is to be investigated with a polarized beam of electromagnetic radiation which impinges thereupon at an angle-of-incidence which is beyond, (eg. 65 degrees), a typical Brewster Angle, which Brewster angle is near seventy-five (75) degrees in most semiconductors. A typical range of angle-of-incidence over which the present invention can be applied is between thirty (30) and eighty (80) degrees from a normal to a sample system surface, with a range of deviation from a Brewster angle of between five (5) and ten (10) degrees being of particular relevance. It is noted that the present invention provides convenient means by which to achieve a smaller electromagnetic beam "Spot" size, (which accompanies a smaller angle-of-incidence on an investigated material system). The present invention also enables realization of laterally-compact ellipsometer or polarimeter or reflectometer and the like Systems.

With an eye to the present invention, a Search of patents was conducted, with the result being that very little was found. A patent to Kasai, U.S. Pat. No. 3,874,797 is disclosed, however, as it describes a system for directing an electromagnetic beam utilizing totally reflecting prisms. As well, a patent to Lange, U.S. Pat. No. 4,801,798 is disclosed as it describes a system which utilizes electromagnetic beam directing reflective means in a system which causes an electromagnetic beam to impinge upon an investigated sample system at an angle very near to a perpendicular to a surface thereof. A patent to Smith, U.S. Pat. No. 4,381,151 is also disclosed as it describes a system in which numerous reflections of a light beam occur.

A paper titled "Division-Of-Amplitude Photopolarimeter Based on Conical Diffraction For a Metallic Grating" by Azzam, in Applied Optics, Vol 31, No. 19, Jul. 1, 1992 and U.S. Pat. No. 5,337,146 are also noted. While the System described in said references is somewhat relevant, the purpose of the System and Method of Use described in said references is to allow simultaneous measurement of all four Stokes Parameters of a Beam of Light.

It is also noted that the reference titled "ELLIPSOMETRY AND POLARIZED LIGHT", by Azzam and Bashara, North-Holland, 1977 is incorporated by reference into this Disclosure for the purpose of providing general information regarding sample analysis systems utilizing electromagnetic beams, and fundamentals of electromagnetic beams.

In view of known prior art, it is apparent that a system, and method of its use, which would allow a user of a sample analysis system such as a reflectometer, ellipsometer, polarimeter or a functionally similar system, to investigate sample systems at non-optimal angles-of-incidence with respect to a normal to a material system surface, without requiring major system reconfiguration procedures be performed, would be of great utility. The present invention provides such a system and method of its use.

DISCLOSURE OF THE INVENTION

The present invention, in its preferred embodiment is an ellipsometer, polarimeter, reflectometer or the like system characterized by the presence of first and second Optical Elements, (PRI) and (PRO), (typically "Prisms"), each of which first and second Optical Elements (PRI) and (PRO) causes a Beam of Electromagnetic Radiation entered along an incident direction thereinto, to exit therefrom in a "Reflected" direction oriented otherwise, (for instance at a ninety (90) degree angle of deviation from the incident direction of said Beam of Polarized Electromagnetic Radiation). In the present invention a first said Optical Element (PRI) is positioned at an input side, and a second said Optical Element (PRO) at an output side of an ellipsometer, polarimeter, reflectometer or the like system. One typically desirable attribute of the present invention in use is that "Reflections" in said first and second Optical Elements be essentially "Totally Internal", so that only negligible Electromagnetic Beam Intensity Attenuation is effected by said reflection. Another typically desirable attribute of the present invention is that "Reflections" in said first and second Optical Elements (PRI) and (PRO) can be made to effect a Retardation between "P" and "S" Components of said Beam of a Polarized Electromagnetic Radiation without affecting the magnitude ratio between "P" and "S" components, (hence PSI remains essentially unchanged).

The present invention System can be described as comprising a Light Source (LS) and a Polarizer (P), which in combination typically serve to produce a generally horizontally oriented propagation direction, Polarized Beam of Electromagnetic Radiation (LBI). In use, said generally horizontally oriented propagation direction, Beam of Electromagnetic Radiation (LBI), (assumed as polarized herein), is caused to interact with a first Optical Element (PRI), essentially totally internally reflect therein, pass through a Focusing Optic (F1) and become a generally vertically oriented propagation direction, Polarized Beam of Electromagnetic Radiation (LBI'), which is caused to interact with a Material System (MS). Said interaction with said Material System (MS) causes a reflected Polarized Beam of Electromagnetic Radiation (LBO') to develop and pass through a Focusing Optic (F2). After passing through Focusing Optic (F2), said generally vertically oriented propagation direction, Polarized Beam of Electromagnetic Radiation (LBO') proceeds essentially vertically and interacts with a second Optical Element (PRO), in which said second Optical Element (PRO) it is essentially totally internally reflected, said essentially totally internal reflection causing said generally vertically oriented propagation direction, Polarized Beam of Electromagnetic Radiation (LBO') to become a generally horizontally oriented Polarized Beam of Electromagnetic Radiation (LBO), which generally horizontally oriented propagation direction, Polarized Beam of Electromagnetic Radiation then (LBO) passes through Analyzer (A) and then enters Detector System (DET), via a typically Circular Aperture (AP), for analysis. (Note that a circular aperture is preferred as the effects of certain aberations in PSI caused by the presence of Focusing Elements (F1) and (F2) are naturally compensated out when said Aperture (AP) is circular. The same is not true regarding DELTA, but errors therein are typical small. If a Slit shaped, for instance, Aperture is utilized said natural compensation of errors in PSI does not occur, emphasis added. Said certain aberations referred to result from the curvature of the surface of a Focusing Element (F1) (F2) upon which a beam of electromagnetic radiation (LBO') is incident in use. Said curvature causes various components in said beam of electromagnetic radiation (LBO') to approach said Focusing Elements at various Angles-Of-Incidence which are symetrical about planes taken through the center of said Focusing Elements (F1) and (F2)).

It is noted that the purpose of the Focusing Optics (F1) is to produce a very Concentrated High Intensity Small "Spot" Area forming Polarized Beam of Electromagnetic Radiation (LB1') from Collimated Polarized Beam of Electromagnetic Radiation (LBI). The purpose of Focusing Optic (F2) is to "Re-Collimate" the Polarized Beam of Electromagnetic Radiation (LBO') which results from the Focused generally vertically oriented propagation direction Polarized Beam of Electromagnetic Radiation (LBI') being Reflected from said Material System (MS). (The re-collimated generally vertically oriented propagation direction, Beam of Electromagnetic Radiation is identified as (LBO) after it has been caused to interact with second Optical Element (PRO)). (It is noted that one or both of the Analyzer (A) and Polarizer (P) can be functionally present in the path of a generally vertically oriented propagation direction, Polarized Beam of Electromagnetic Radiation (LBI') or (LBO')).

Now, it is to be understood that generally vertically oriented propagation direction, Polarized Beams of Electromagnetic Radiation (LBI') and (LBO') approach and are reflected from Material System (MS) at equal angles of Incidence and Reflection (Θ), respectively, as viewed in frontal elevation. That is, generally vertically oriented propagation direction, incident and reflected beams of Electromagnetic Radiation (LBI') and (LBO') respectively form a "V" shape therebetween, as viewed in frontal elevation. Further, it is to be noted that a generally vertically oriented Polarized Beam of Electromagnetic Radiation (LBI') caused to be incident on a Material System (MS) at Seventy-Five (75) Degrees, (a typical Brewster Angle for Semiconductors), with respect to a normal to a Material System (MS) surface, will "Spread" on the surface of said Material System (MS) so that relative dimensions of the electromagnetic beam "Spot" caused to appear on said Material System (MS) are One (1) by Four (4). Where the Angle-of-Incidence is set to Sixty-Five (65) Degrees, however, the "Spot" size will have relative dimensions of One (1) by Two and one-half (2.5). This demonstrates that the closer to a Normal Angle-of-Incidence, (eg. (Θ)=zero (0.0) degrees), with respect to a Material System (MS) surface), a Polarized Beam of Electromagnetic Radiation (LBI') is caused to assume, the more "Concentrated" will be the Beam "Spot" Intensity, and the smaller will be the Material System (MS) Investigating Beam "Spot" Size. In addition, at the Brewster Angle the reflectivity of the "P" component of a polarized beam of electromagnetic radiation is ideally zero (0.0). As the angle-of-incidence progresses away from the Brewster Angle said reflectivity increases. This effect will also serve to increase reflected beam intensity. Higher Beam Intensity and Reduced Material System Investigating Beam "Spot" Size are often both desirable features in that they enable better Detection and Resolution. Higher Beam Intensity and Reduced Material System Investigating "Spot" Size can be easily achieved utilizing the present invention system without difficult Light Source (LS) and Detector (DET) alignment being required. Simply adjustment of first and/or second Optical Elements (PRI) and (PRO) often being sufficient, with horizontal spacing of Light Source (LS)/Analyzer (A) and Detector (DET)/Polarizer (P) being possibly involved as well.

Continuing, a shortcomming of many Ellipsometer Systems, (with Rotating Compensator Ellipsometer Systems being an exception), is that certain magnitudes of well known Material System (MS) characterizing PSI or DELTA can not be monitored thereby. For instance, in Rotating Analyzer and Rotating Polarizer Ellipsometer Systems, Material Systems with DELTA near zero (0.0) or one-hundred-eighty (180) Degrees can not be accurately measured, (and in Modulation Element Ellipsometer Systems investigation of Material Systems (MS) with a PSI of Forty-Five (45) Degrees is also a problem). It is further noted that a Thin Dielectric Film on a semiconductor substrate or transparent material system, (eg. Nitride), often presents with a DELTA of zero (0.0) or one-hundred-eighty (180) Degrees over a spectral range, where a Polarized Electromagnetic Beam Angle-of-Incidence away from an associated Brewster Angle, (eg. seventy-five (75) degrees where semiconductor is involved), is utilized. Thick films present on a sample system surface can effect a DELTA value other than zero (0.0) or one-hundred-eighty (180) Degrees where other than a Brewster Angle angle-of-incidence is utilized, but generally operation at the Brewster Angle is desirable. The present invention recognizes this problem and can utilize first and second Optical Elements (PRI) and (PRO) which effect Phase Angle Retardation between "P" and "S" Orthogonal Components of a Polarized Beam of Electromagnetic Radiation caused to pass therethrough. (Note that a "P" Component of a Polarized Beam of Electromagnetic Radiation is that Component found to be in a Plane containing both an Incident Beam of Electromagnetic Radiation and a Normal to a Material System Surface, while an "S" Component is that Component perpendicular to said "P" Plane and Parallel to the Material System Surface). The Phase Angle Retardation between "P" and "S" Orthogonal Components of a Polarized Beam of Electromagnetic Radiation caused to pass therethrough can be caused to nominally forty-five (45) degrees for each of said first and second Optical Elements (PRI) and (PRO) shown in FIG. 2, for a total of a nominal ninety (90) degrees. This added retardation between "P" and "S" orthogonal components serves to shift the Material System (MS) DELTA's which a Rotating Analyzer Ellipsometer will be unable to measure to Ninety (90) and Two-Hundred-Seventy (270) Degrees. Again, most Material Systems (MS) investigated at non-optimal angles-of-incidence, (ie. away from the Brewster Angle), present a DELTA of near zero (0.0) or one-hundred-eighty (180) degrees, hence the present invention first and second Optical Elements (PRI) and (PRO) can serve not only to direct a Polarized Beam of Electromagnetic Radiation as desired, but also serve to "Condition" said Polarized Beam of Electromagnetic Radiation so that it can be utilized to measure Material System DELTA's which are in the range of near zero (0.0) degrees or near one-hundred-eighty (180) degrees. It is again mentioned that where a Total Internal Reflectance occurs, (as in a Prism utilized in the present invention), there is no change effected in a PSI value. This feature greatly simplifies system calibration and modulation processes. (Note that reflection of a polarized beam of electromagnetic radiation, as off a mirror, typically involves some attenuation of "P" and/or "S" components in a polarized beam of electromagnetic radiation. Said attenuation can result in a change in a PSI value, which is a ratio of said "P" and "S" component intensities).

It is also noted that typically available Optical Elements which are adaptable for use in the present invention allow a range of adjustment regarding the amount of Retardation entered to a Polarized Beam of Electromagnetic Radiation caused to interact therewith, said adjustment being effected by Optical Element Position Orientation. Examples of preferred Optical Elements are Right Angle Prisms provided by OptoSigma Corporation of Anaheim Calif.

Continuing, while each of the first and second Optical Elements, (PRI) and (PRO), typically provides a single essentially total internal reflection angle of ninety (90) degrees so as to direct generally vertically oriented Incident Polarized Beam of Electromagnetic Radiation (LBI') at Ninety (90) Degrees with respect to said generally horizontally oriented Polarized Beam of Electromagnetic Radiation (LBI), and so as to direct said generally vertically oriented Polarized Beam of Electromagnetic Radiation (LBO') at Ninety (90) Degrees with respect to said generally horizontally oriented Polarized Beam of Electromagnetic Radiation (LBO), other Optical Elements which provide other Angles between Incident and Totally Internally Reflected Beams of Electromagnetic Radiation can also be adapted for use in the present invention, as can Optical Elements which introduce other than essentially forty-five (45) degrees of retardation between orthogonal "P" and "S" components of a Polarized Beam of Electromagnetic Radiation at a point of essentially total internal reflection in a present invention first and/or second Optical Element (PRI) and (PRO).

It should also be recognized that the presence of said first and second Optical Elements (PRI) and (PRO) allow realization of a more laterally compact Ellipsometer or Polarimeter System Design, in that the Source of Electromagnetic Radiation (LS) and Detector (DET) can be placed other than to the Right and Left of the Material System (MS) as is typical in most conventional Ellipsometer Systems. While this on its own might not be Patentably significant, it is felt that combined with diverting generally horizontally oriented Beams of Electromagnetic Radiation (LBI) and (LBO) to generally vertically oriented Beams of Electromagnetic Radiation (LBI') and (LBO'), and with entering retardation between "P" and "S" orthogonal components of a Polarized Beam of Electromagnetic Radiation caused to pass through a first and/or second Optical Element (PRI) or (PRO) provides Patentable distinction over all known prior art.

In addition, the present invention can be practiced utilizing Prism Elements (PRI) and (PRO) which are made of different materials. For instance, (PRI) can be made of BK7 with an index of refraction of approximately 1.55, and (PRO) can be made of F2 with an index of refraction of approximately 1.7. The preferred embodiment of the present invention actually utilizes (PRI) and (PRO) Optical Elements which are made of the identified different materials. One reason this is done is because if both Optical Elements are made of BK7, total internal reflection in both causes under eighty (80) degrees of retardation to occur between "P" and "S" components in a beam of electromagnetic radiation. If both Optical Elements (PRI) and (PRO) are made of F2, then the total retardance entered between "P" and "S" components in a beam of electromagnetic radiation by two total internal reflections is over one-hundred (100) degrees. However utilizing an Optical Element (eg. Prism) made of BK7 at (PRI) and an Optical Element (eg. Prism) made of F2 at (PRO) provides approximately ninety (90) degrees of retardance to occur between "P" and "S" components in a beam of electromagnetic radiation caused to totally internally reflect in both. As alluded to infra herein, this is ideally what is typically desired. In addition, and more importantly, it is to be understood that the present invention preferably utilizes a relatively lower index of refraction material, (eg. BK7 with an index of refraction of approximately 1.55), at (PRI) as compared to the index of refraction of the material from which (PRO) is made, (eg. F2 with an index of refraction of approximately 1.7). This is because the higher the index of refraction of a material, the less sensitive is its effect on entered retardation between "P" and "S" components in a beam of electromagnetic radiation caused to totally internally reflected thereby, to Angle-Of-Incidence (AOI) of said beam of electromagnetic radiation caused to be totally internally reflected therein. It is noted that alignment of the present invention sets an (AOI) at which a beam of electromagnetic radiation impinges upon a totally reflecting surface of a Prism at (PRI) and said (AOI) does not thereafter change, but the (AOI) at which a beam of electromagnetic radiation approaches a totally reflecting surface of a Prism at (PRO) can change based upon Material System (MS) surface topology being investigated, after initial alignment has been effected. Thus, it is preferable to have a Prism made of a material with as high as possible index of refraction material present at (PRO), (because the sensitivity of its effect on a beam of electromagnetic radiation to (AOI) is less than is the case where a relatively lower index of refraction material is present).

The present invention will be better understood by reference to the Detailed Description Section of this Disclosure, in combination with the Drawings.

SUMMARY OF THE INVENTION

It is therefore a primary purpose of the present invention to teach a material investigation system such as an ellipsometer, polarimeter or reflectometer, and method of use thereof, comprising input and output optical elements, each of which effects a change in propagation direction, orientation of a beam of electromagnetic radiation by an essentially total internal reflection therein of, typically, ninety (90) degrees.

It is another purpose of the present invention to teach that a beam of electromagnetic radiation diverted in propagation direction, orientation by an input or output optical element can be simultaneously, optionally, caused to have a phase retardation entered between orthogonal polarization components thereof by at least one of said input and output optical elements.

It is yet another purpose of the present invention to provide a solution to a problem in use of reflectometers, ellipsometers, polarimeters and functionally similar sample analysis systems, which presents when a sample system is to be investigated with a polarized beam of electromagnetic radiation which impinges thereupon at an angle-of-incidence beyond a typical Semiconductor Brewster Angle of seventy-five (75) degrees, (eg at sixty (60) to sixty-five (65) degrees).

It is still yet another purpose of the present invention to teach a means for providing convenient means by which to achieve a smaller electromagnetic beam "Spot" size, (which accompanies a smaller angle-of-incidence on an investigated material system) which accompanies a smaller angle-of-incidence.

Yet another purpose of the present invention to teach the use of totally internally reflecting optical elements on input and output sides of polarimeter or reflectometer and the like systems which are made of different materials with different indicies of refraction.

Still yet another purpose of the present invention to identify the preferred use of a circular shaped aperture at the input to a detector system in the present invention.

Yet still another purpose of the present invention is to teach a means which enables realization of laterally-compact ellipsometer or polarimeter or reflectometer and the like systems.

BRIEF DESCRIPTION OF THE DRAWINGS

FIG. 1a shows a perspective view of a present invention system showing the presence of optical elements (PRI) and (PRO).

FIG. 1b shows a side elevational view of a present invention system in the region of a material system.

FIG. 1c shows a top elevational view of a present invention system in the region of the detector.

FIG. 2 shows a top view of a present invention system showing the presence of optical elements (PRI) and (PRO).

DETAILED DESCRIPTION

Figure 3A:
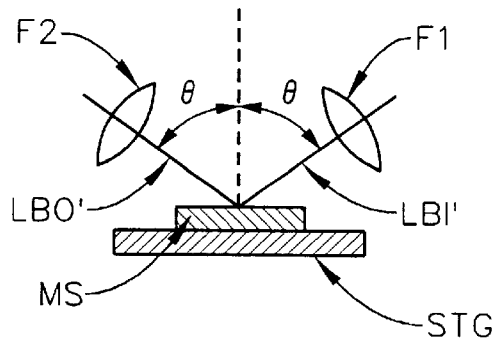
FIG. 3a shows a partial front elevational view of a present invention system.

Turning now to the Drawings, a preferred embodiment of the present invention System is shown in FIGS. 1a, 2 and 3a.

FIG. 1a shows a Perspective view of a present invention system, FIG. 2 is a Top View, and FIG. 3a is a Front Elevational View. FIG. 1a shows a Light Source (LS) and a Polarizer (P), which in combination serve to produce a generally horizontally oriented propagation direction Polarized Beam of Electromagnetic Radiation (LBI). Said generally horizontally oriented propagation direction, Polarized Beam of Electromagnetic Radiation (LBI) is caused to interact with Optical Element, (eg. Prism), (PRI), essentially totally internally reflect therein, pass through Focusing Optic (F1) and become generally vertically oriented propagation direction, Polarized Beam of Electromagnetic Radiation (LBI'), then interact with a Material System (MS) present on a Material System supporting Stage (STG). FIGS. 1a and 2 show that said interaction with the Surface (S) of said Material System (MS) causes a generally vertically oriented propagation direction, Polarized Beam of Electromagnetic Radiation (LBO') to pass through Focusing Optic (F2). FIGS. 1a and 2 show that after passing through Focusing Optic (F2) said generally vertically oriented propagation direction, Polarized Beam of Electromagnetic Radiation (LBO') interacts with Optical Element, (eg. Prism), (PRO) and is essentially totally internally reflected thereby to become generally horizontally oriented propagation direction, Polarized Beam of Electromagnetic Radiation (LBO), which generally horizontally oriented propagation direction, Polarized Beam of Electromagnetic Radiation (LBO) passes through Analyzer (A) and then enters Detector System (DET), via Circular Aperture (AP), for analysis. It is noted that the purpose of the Focusing Optics (F1) is to produce a very Concentrated High Intensity Small Area Polarized Beam of Electromagnetic Radiation (LBI') from Collimated Polarized Beam of Electromagnetic Radiation (LBI). The purpose of Focusing Optic (F2) is to "Re-Collimate" the generally vertically oriented propagation direction, Polarized Beam of Electromagnetic Radiation (LBO') which results from the Focused Polarized Beam of Electromagnetic Radiation (LBI') being Reflected from said Material System (MS). The Re-Collimated generally vertically oriented propagation direction, Beam of Electromagnetic Radiation (LBI') being identified as generally horizontally oriented propagation direction, Beam of Electromagnetic Radiation (LBO) after it has been caused to interact with Prism (PRO). FIG. 1b shows a side elevational view of the present invention system shown in FIG. 1a, in the region of the Material System (MS). Note that the dashed line (S') indicates that varying Surface (S) region alignment is possible, and that such has an effect on the Angle-Of-Incidence at which the generally vertically oriented propagation direction, Polarized Beam of Electromagnetic Radiation (LBO') approaches the totally reflecting surface in Optical Element (PRO). FIG. 1c shows a more detailed, Top View, of a present invention Detector (DET) system as indicated in FIG. 1a.

Figure 7:
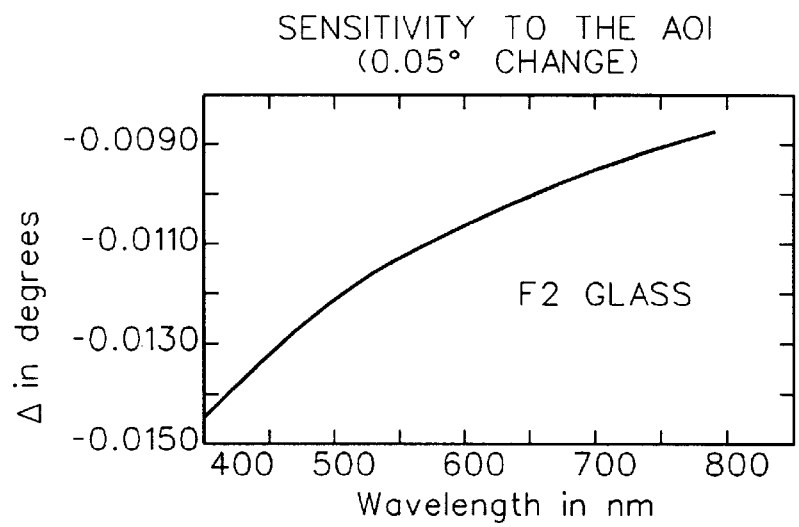
FIGS. 7 and 8 show sensitivity of DELTA of F2 and BK7 Glass to a 0.05 degree change in Angle-Of-Incidence over a spectroscopic range.
Figure 8:
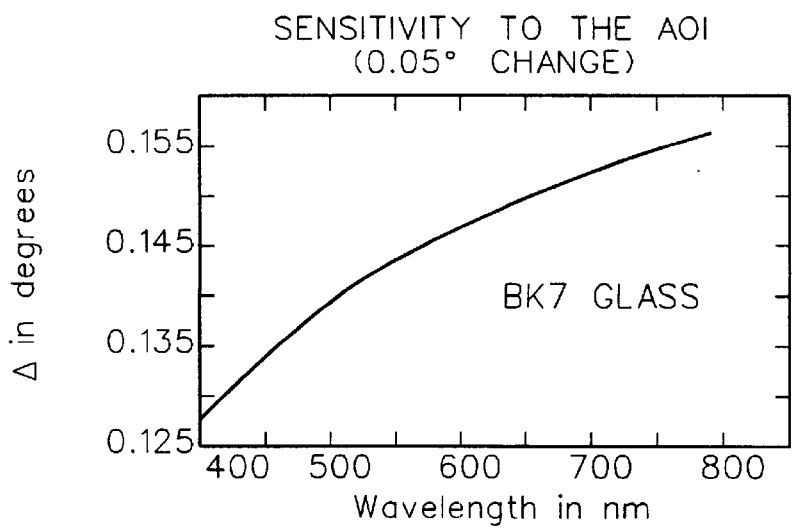
Figure 9A:
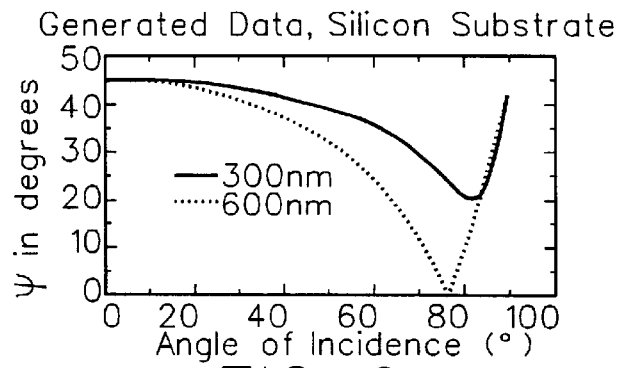
FIGS. 9a and 9c show PSI as functions of Angle-Of-Incidence for Silicon and for Silicon with a thin Oxide layer present on the surface thereof, respectively.
Figure 9B:
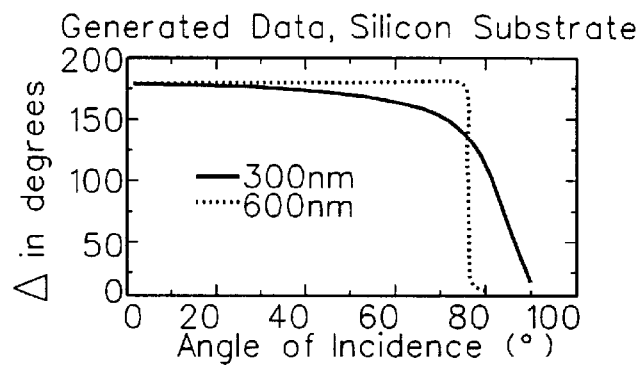
FIGS. 9b and 9d show DELTA as functions of Angle-Of-Incidence for Silicon and for Silicon with a thin Oxide layer present on the surface thereof, respectively.
Figure 9C:
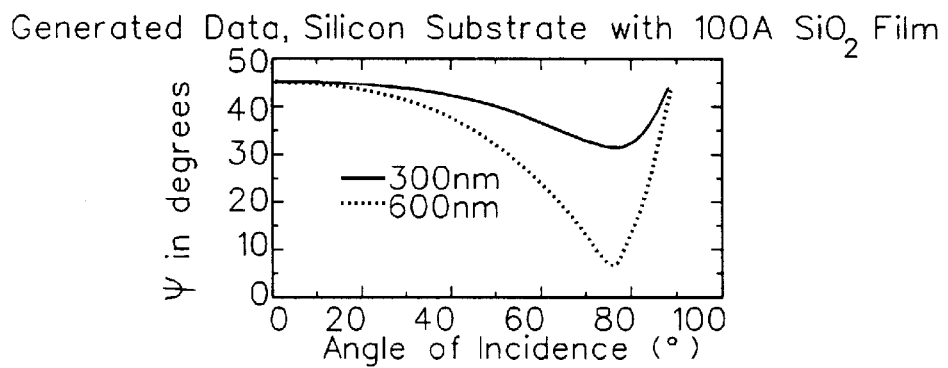
Figure 9D:
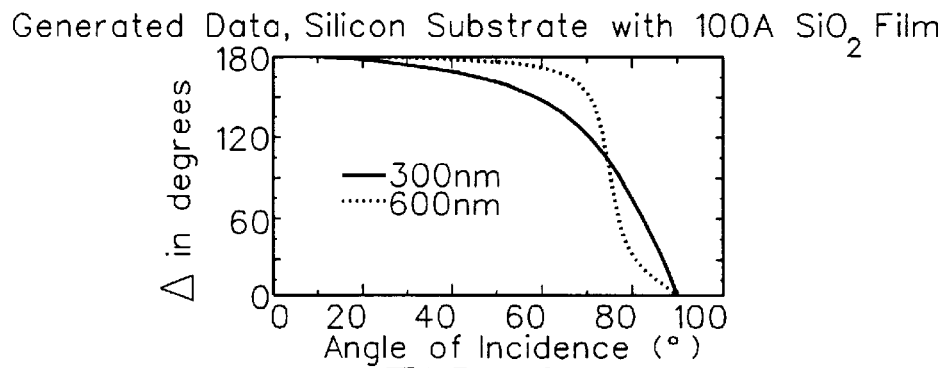
Figure 10A:
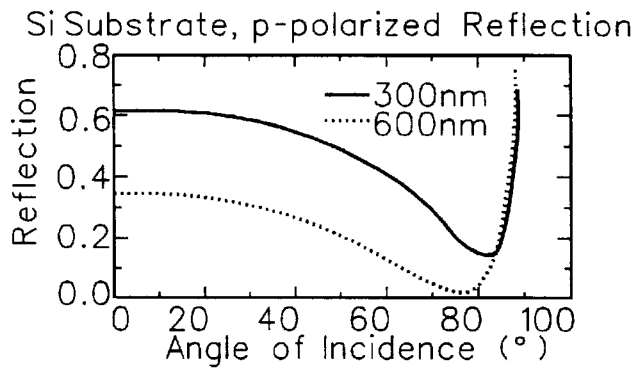
FIGS. 10a and 10c show P-polarized reflection as functions of Angle-Of-Incidence for Silicon and for Silicon with a thin Oxide layer present on the surface thereof, respectively.
Figure 10B:
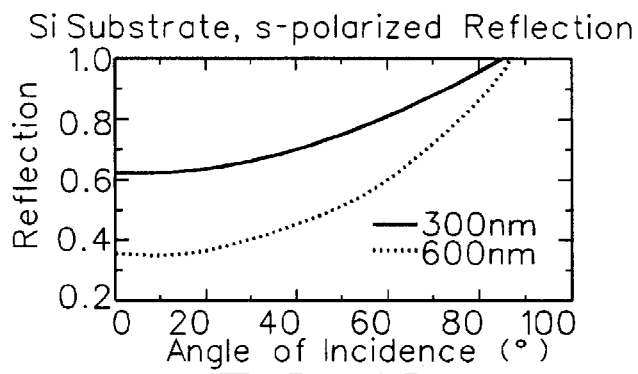
FIGS. 10b and 10d show S-polarized reflection functions of Angle-Of-Incidence for Silicon and for Silicon with a thin Oxide layer present on the surface thereof, respectively.
Figure 10C:
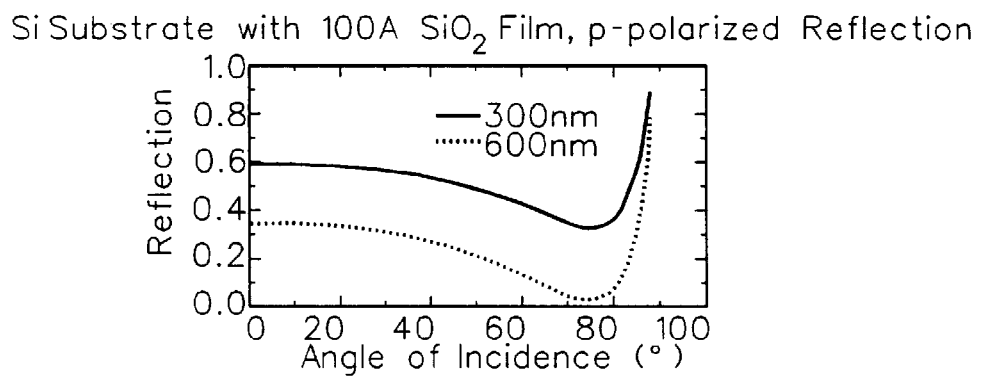
Figure 10D:
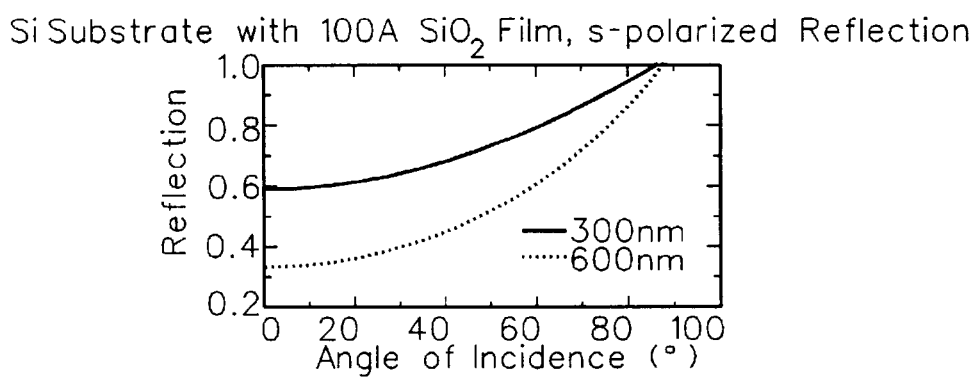

It is noted, as better described in the Disclosure of the Invention Section herein, that (PRI) and (PRO) can be made of the same material, but the preferred embodiment provides that (PRI) be made of BK7 (refractive index approximately 1.55) and that (PRO) be made of F2 (refractive index approximately 1.7). For general interest, note that FIGS. 7 and 8 show sensitivity of DELTA to change in Angle-Of-Incidence (AOI) for F2 and BK7 Glass, respectively.

For demonstration purposes, FIG. 2 also shows, in dotted line form, Compensators (C) and (C'). When present one or more present Compensator(s) can be caused to rotate in use and the system is then a Rotating Compensator System and while obtaining data, both Polarizer (P) and Analyzer (A) are then held stationary. However, the Compensator(s) (C) and (C') can be absent or held stationary in use, and in use at least one of the Polarizer (P) and Analyzer (A) elements caused to rotate, thereby forming a Rotating Polarizer and/or Rotating Analyzer System. For the purposes of the present invention the specific element caused to rotate, or which is rotatable, in use is not a primary focus of Patentability. Rather, it is the presence of Total Internal Reflectance effecting Optical Elements (PRI) and (PRO) which characterize the present invention. (It is also to be understood that the (C) and (C') can be interpreted to identify Modulator Elements in a Modulation Element Ellipsometer System).

Figure 3B:
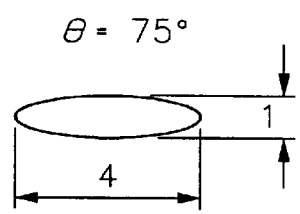
FIG. 3b shows a relative electromagnetic beam "Spot" size where an angle of incidence of seventy-five (75) degrees is utilized.
Figure 3C:
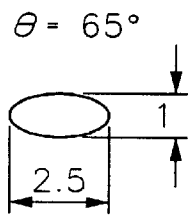
FIG. 3c shows a relative electromagnetic beam "Spot" size where an angle of incidence of sixty-five (65) degrees is utilized.

FIG. 3a shows that as viewed in frontal elevation, generally vertically oriented propagation direction, Polarized Beams of Electromagnetic Radiation (LBI') and (LBO') approach and are reflected from, respectively, Material System (MS) at equal angles of Incidence and Reflection (⊖) with respect to a normal to the upper surface of said Material System (MS). It is to be noted, as demonstrated by FIG. 3b, that a generally vertically oriented propagation direction, Polarized Beam of Electromagnetic Radiation (LBI') caused to be incident on a Material System (MS) at Seventy-Five (75) Degrees, (a typical Brewster Angle for Semiconductors), will "Spread" so that relative dimensions of the Beam "Spot" caused to appear on said Material System (MS) are One (1) by Four (4). Where the Angle of Incidence is set to Sixty-Five (65) Degrees, FIG. 3c shows that the Spot size in shown to have relative dimensions of One (1) by Two and one-half (2.5). This demonstrates that the closer to a Normal Angle of Incidence, (eg. (⊖)=zero (0.0) Degrees), with respect to a Material System (MS) surface), a generally vertically oriented propagation direction, Polarized Beam of Electromagnetic Radiation (LBI') is caused to assume, the more "Concentrated" will be the Beam Intensity, and the smaller will be the Material System Investigating Spot Size. Higher Beam Intensity and Reduced Material System Investigating Spot Size are often both desirable features, and can be easily achieved utilizing the present invention system without difficult Light Source (LS) and Detector (DET) alignment being required. For general interest, FIGS. 9a–9d and 10a–10d show PSI, DELTA and Reflectivity, (see graph labeling), as a function of Angle-Of-Incidence, for Silicon and Silicon with an Oxide layer, respectively.

Continuing, a shortcomming of Rotating Element Ellipsometer Systems, (other than Rotating Compensator Ellipsometers), generally is that certain Magnitudes of well known Material System characterizing PSI or DELTA can not be monitored thereby. For instance, in Rotating Analyzer Ellipsometer Systems, Material Systems with DELTA near zero (0.0) or one-hundred-eighty (180) Degrees can not be measured. It is also noted that Thin Dielectric Films, such as Nitride and Oxide on semiconductor substrates, often present with a DELTA of one-hundred-eighty (180) Degrees at Angle of Incidence of less than the Brewster Angle, (eg. sixty-five (65) Degrees). The present invention recognizes this problem and can utilize first and/or second Optical Elements, (eg. Prisms), (PRI) and (PRO) which effect Phase Angle Retardation between "P" and "S" Orthogonal Components of a Polarized Beam of Electromagnetic Radiation caused to pass therethrough. (Note that a "P" Component of a Polarized Beam of Electromagnetic Radiation is that Component found to be in a Plane containing both an Incident Beam of Electromagnetic Radiation and a Normal to a Material System Surface, while an "S" Component is that Component perpendicular to said "P" Plane and Parallel to the Material System Surface). The Phase Angle Retardation between "P" and "S" Orthogonal Components of a Polarized Beam of Electromagnetic Radiation caused to pass therethrough can be caused to Nominally Forty-Five (45) Degrees for each Optical Element (PRI) and (PRO) shown in FIG. 2, for a total of a Nominal Ninety (90) Degrees. This added Retardation between "P" and "S" Orthogonal Components serves to shift the Material System DELTA's which a Rotating Analyzer Ellipsometer will be unable to measure to Ninety (90) and Two-Hundred-Seventy (270) Degrees. Again, most Thin Film Material Systems present a DELTA of near zero (0.0) and one-hundred-eighty (180) Degrees, hence the first and second Optical Elements (PRI) and (PRO) serve not only to direct a Polarized Beam of Electromagnetic Radiation as desired, but also serve to "Condition" said Polarized Beam of Electromagnetic Radiation so that it can be utilized to measure Material System DELTA's which are in the range of near zero (0.0) Degrees or near one-hundred-eighty (180) degrees.

Continuing, while FIG. 2 shows each of the first and second Optical Elements (PRI) and (PRO) as providing a total internal reflection angle of ninety (90) degrees, so as to direct said generally vertically oriented propagation direction, Incident Polarized Beam of Electromagnetic Radiation (LBI') at Ninety (90) Degrees with respect to said generally horizontally oriented propagation direction, Polarized Beam of Electromagnetic Radiation (LBI), and so as to direct said generally horizontally oriented propagation direction, Polarized Beam of Electromagnetic Radiation (LBO) at Ninety (90) Degrees with respect to said generally vertically oriented propagation direction, Polarized Beam of Electromagnetic Radiation (LBO'), other Optical Elements which provide other Angles between Incident and internally Reflected Beams of Electromagnetic Radiation can also be adapted for use in the present invention, and said usage is within the scope of the present invention. In such a case the terminology "generally horizontally oriented" and "other than generally horizontally oriented" serves to describe the relationship between incident and reflected beams of electromagnetic radiation. As well, Optical Elements which introduce other than essentially forty-five (45) degrees of retardation between "P" and "S" components of a Polarized Beam of Electromagnetic Radiation at a point of total internal reflection can be utilized. For instance, in a Rotating Compensator Ellipsometer System, as close to zero (0.0) degrees of entered retardation at a reflection as is possible might be desirable.

It should also be recognized that the presence of first and second Optical Elements (PRI) and (PRO) allow realization of a more laterally compact Ellipsometer or Polarimeter System Design, in that, as shown in FIG. 2, the Source of Electromagnetic Radiation (LS) and Detector (DET) can be placed as shown, rather than to the Right and Left of the Material System (MS) as is typical in most Ellipsometer Systems.

Figure 4A:
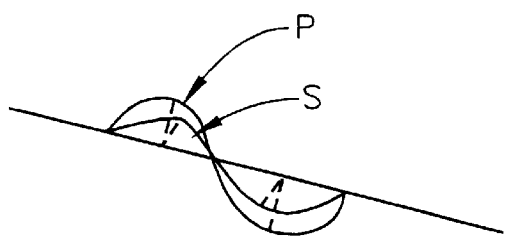
FIG. 4a shows "in-phase" components of a polarized beam of electromagnetic radiation.
Figure 4B:
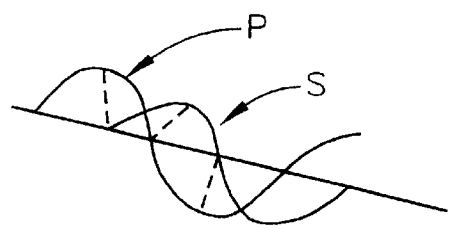
FIG. 4b shows "ninety-degree-out-of-phase" components of a polarized beam of electromagnetic radiation.

FIGS. 4a and 4b show "P" and "S" Components of a Polarized Beam of Electromagnetic Radiation for both "In-Phase" and "Ninety (90) Degrees Retardation" therebetween, respectively.

Figure 5:
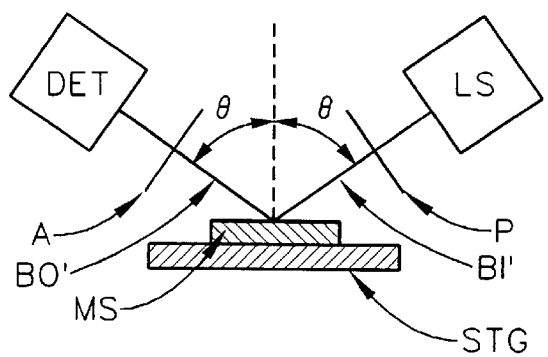
FIG. 5 shows a conventional prior art ellipsometer system.

FIG. 5 is included to provide a reference to conventional ellipsometer and polarimeter and the like Material System investigation systems reported in the prior art. Note that a Light Source (LS), Polarizer (P), Material System (MS) Analyzer (A) and Detector (DET) are shown, as well as Incident (BI') and Reflected (BO') Electromagnetic Radiation Beams, (which are respectively, analogically, similarly positioned as are (LBI') and (LBO') in FIG. 3a). The region of FIG. 5 in the vicinity of the Material System (MS) is very much like what is shown in FIG. 3a. However, the placement of the Light Source (LS) and Detector (DET) are shown to be necessarily very different from that shown in FIGS. 1a and 2, as the present invention first and second Optical Elements (PRI) and (PRO), shown in FIGS. 1a and 2, are not present. It is noted that adjustment of Light Source (LS) and Detector (DET) positioning to allow different Angles-of-Incidence (Θ) to be achieved is inherently more difficult in a system fashioned after FIG. 5, than it is in a present invention system fashioned after FIGS. 1a and 2.

Figure 6:
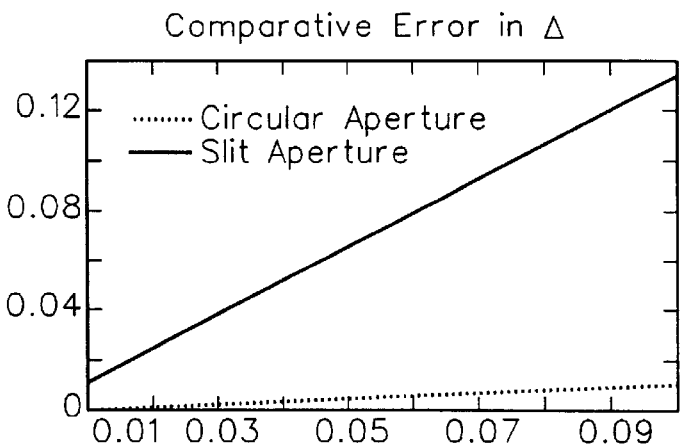
FIG. 6 shows, in graph form, the DELTA error reducing benefits of providing a circular, rather than a slit shaped, aperture at the input to the detector of the present invention system.

FIG. 6 shows a graph which demonstrates the importance of utilizing a Circular shaped Aperture (AP) after the Analyzer and before the present invention Detector (DET) system. The dashed line shows error in PSI caused by the presence of a curved surface at the Focusing Element (F2) where Beam of Electromagnetic Radiation (LBO') impinges thereupon, and where the Aperture (AP) is circular in shape, and the solid line shows a similar result where the Aperture is a Slit shape. The use of a circular shaped Aperture in the present invention is then important.

For convenient reference, and to supplement the foregoing discussion, FIGS. 7 and 8 show sensitivity of F2 and BK7 Glass to a five-one-hundredth (0.05) degree change in Angle-Of-Incidence over a spectral range.

As mentioned, for convenient reference, and to supplement the foregoing discussion, FIGS. 9a–9d and 10a–10d show PSI, DELTA and Reflectivity, (see Graph labeling), for Silicon and for Silicon with Silicon Dioxide present on the surface thereof, respectively, over a spectral range.

It is also to be noted that the terminology "generally horizontally oriented" and "generally vertically oriented" has been utilized in the foregoing Disclosure. Said terminology is specific to the systems involved and is meant to indicate relative propagation direction, orientation between Electromagnetic Beam orientation prior to, (after), and after, (prior to), interaction with an Optical Element (PRI) or (PRO). Said propagation direction, orientation can be, and typically is, aligned with an external frame of reference. However, said material investigating system orientation can be rotated with respect to and external frame of reference. That is, in this Disclosure, the terminology "generally horizontally oriented" is not to be interpreted to require alignment with an external generally horizontally oriented frame of reference. Again, a present invention ellipsometer, polarimeter or reflectometer and the like system will typically be aligned with an external frame of reference so that a generally horizontally oriented propagation direction, beam of electromagnetic radiation is aligned with an external horizontal direction, and so that a generally vertically oriented propagation direction, beam of electromagnetic radiation is aligned with an external vertical direction, but it is to be understood that the present invention system can be rotated with respect to an external frame of reference and still be within the scope of the claims. The terminology "generally horizontally oriented" and/or "generally vertically oriented" and/or "other than generally horizontally oriented" is not to be interpreted to impose restrictions based upon orientation of a present invention system with respect to frames of reference external to a present invention system during use. Said language is used only as a convenient means to describe relative orientation of electromagnetic beam orientations within a present invention system during use, and rotation of a present invention system as a whole is not to be interpreted to place it outside the scope of the claims. In addition, "generally horizontal" and "generally vertical" can each be interpreted to identify Planes in which incident and reflected beams of electromagnetic radiation are simultaneously present. Otherwise stated, incident and reflected "generally vertically oriented" beams of electromagnetic radiation, for instance, serve to define a "generally vertically oriented" plane. A similar statement is true regarding a "generally horizontally oriented" plane.

Having hereby disclosed the subject matter of the present invention, it should be apparent that many modifications, substitutions, and variations of the present invention are possible in light thereof. It is to be understood that the present invention can be practiced other than as specifically described and should be limited in scope and breadth only by the appended claims.

I claim:

1. A material system investigating system selected from the group consisting of:

ellipsometer;

polarimeter; and reflectometer systems;

said material system investigating system comprising:

a. a light source (LS);

b. a polarizer (P);

c. a first optic element (PRI);

d. a first focusing optic (F1);

e. a material system stage (STG);

f. a second focusing optic (F2);

g. a second optic element (PRO);

h. an analyzer (A);

i. a detector (DET); and j. optionally compensator(s) (C) (C');

said light source (LS) and polarizer (P), serving in use to produce a generally horizontally oriented propagation direction, polarized beam of electromagnetic radiation (LBI), said generally horizontally oriented propagation direction, polarized beam of electromagnetic radiation (LBI) being caused to interact with said first optic element (PRI) and by essentially total internal reflection therein become other than a generally horizontally oriented propagation direction, polarized beam of electromagnetic radiation (LBI') which is caused to pass through said first focusing optic (F1) and interact with a material system (MS) placed upon said material system stage (STG), said interaction with said material system (MS) causing a reflected other than generally horizontally oriented propagation direction, polarized beam of electromagnetic radiation (LBO') to pass through said second focusing optic (F2) and interact with said second optic element (PRO), in which second optic element (PRO) said generally other than horizontally oriented propagation direction, polarized beam of electromagnetic radiation (LBO') is, by essentially total internal reflection, caused to become a generally horizontally oriented propagation direction, polarized beam of electromagnetic radiation (LBO), which generally horizontally oriented propagation direction, polarized beam of electromagnetic radiation then (LBO) then passes through analyzer (A) and, via an essentially circular shaped aperture (AP), enters said detector system (DET) for analysis, which generally other than horizontally oriented propagation direction, polarized beams of electromagnetic radiation (LBI') and (LBO') approach and are reflected from, respectively, said material system (MS) at essentially equal angles of incidence and reflection (Θ), as viewed in frontal elevation.

2. A material system investigating system as in claim 1 in which the generally other than horizontally oriented propagation direction, is a generally vertically oriented propagation direction.

3. A material system investigating system as in claim 1 in which said first focusing optics (F1) serves to produce a focused very concentrated high intensity small area generally other than horizontally oriented propagation direction, polarized beam of electromagnetic radiation (LBI') at the location of the material system (MS), and said second focusing optic (F2) serves to collimate the polarized beam of electromagnetic radiation (LBO') which results from the focused very concentrated high intensity small area generally other than horizontally oriented propagation direction, polarized beam of electromagnetic radiation (LBI') at the location of the material system (MS), being reflected from said material system (MS).

4. A material system investigating system as in claim 1 in which smaller angles of incidence and reflection of said generally other than horizontally oriented propagation direction, polarized beams of electromagnetic radiation (LBI') and (LBO') with respect to said material system (MS) result in higher intensity and smaller "spot" size of said polarized beam of electromagnetic radiation caused on said material system (MS).

5. A material system investigating system as in claim 4 in which said higher beam intensity and reduced sample system investigating spot size are realized without difficult light source (LS) and detector (DET) alignment being required, but rather by relatively easy adjustment of first and second optical element (PRI) and (PRO) orientations.

6. A material system investigating system as in claim 1 in which phase angle retardation between "P" and "S" orthogonal components of a polarized beam of electromagnetic radiation caused to interact therewith is effected by said essentially total internal reflection in at least one of said first and second optic elements (PRI) and (PRO).

7. A material system investigating system as in claim 6, in which each of said first and second optic elements (PRI) and (PRO) provide forty-five (45) degrees of phase angle retardation between "P" and "S" orthogonal components of a polarized beam of electromagnetic radiation caused to interact therewith .

8. A material system investigating system as in claim 1 in which said first (PRI) and second optic (PRO) elements meet at least one of the one of the following:
  a. both are prisms;
  b. both are made of the same material;
  c. said first optical element (PRI) is made of a different material than is said second optical element (PRO);
  d. said first optical element (PRI) is made of a material which presents with a lower index of refraction material than does the material of said second optical (PRO) element; and
  e. said first optical element (PRI) is made of BK7 with a refractive index of approximately 1.55, and said second optical element (PRO) is made of F2 with a refractive index of approximately 1.7.

9. A material system investigating system as in claim 1 which in use is rotated about at least one axis, so as to place the generally horizontally oriented propagation directions of the polarized beams of electromagnetic radiation (LBI) and (LBO), and/or the other than generally horizontally oriented propagation directions of the polarized beams of electromagnetic radiation (LBI') and (LBO'), out of alignment with an external frame of reference for generally horizontally oriented and/or generally other than horizontally oriented direction(s).

10. A method of investigating a material system comprising the steps of:
  a. providing a material system investigating system comprising:
    a. a light source (LS);
    b. a polarizer (P);
    c. a first optic element (PRI);
    d. a first focusing optic (F1);
    e. a material system stage (STG);
    f. a second focusing optic (F2);
    g. a second optic element (PRO);
    h. an analyzer (A);
    i. a detector (DET); and
    j. optionally compensator(s) (C) (C');
  said light source (LS) and polarizer (P), serving in use to produce a generally horizontally oriented propagation direction, polarized beam of electromagnetic radiation (LBI), said generally horizontally oriented propagation direction, polarized beam of electromagnetic radiation (LBI) being caused to interact with said first optic element (PRI) and by essentially total internal reflection therein become a generally vertically oriented propagation direction, polarized beam of electromagnetic radiation (LBI') which is caused to pass through said first focusing optic (F1) and interact with a material system (MS) placed upon said material system stage (STG), said interaction with said material system (MS) causing a reflected generally vertically oriented propagation direction, polarized beam of electromagnetic radiation (LBO') to pass through said second focusing optic (F2) and interact with said second optic element (PRO), in which second optic element (PRO) said generally vertically oriented propagation direction, polarized beam of electromagnetic radiation (LBO') is, by essentially total internal reflection, caused to become a generally horizontally oriented propagation direction, polarized beam of electromagnetic radiation (LBO), which generally horizontally oriented propagation direction, polarized beam of electromagnetic radiation then (LBO) then passes through analyzer (A) and, via an essentially circular shaped aperture (AP), enters said detector system (DET) for analysis, which generally vertically oriented propagation direction, polarized beams of electromagnetic radiation (LBI') and (LBO') approach and are reflected from, respectively, said material system (MS) at essentially equal angles of incidence and reflection ( ), as viewed in frontal elevation;
  b. causing said light source (LS) and a polarizer (P), to produce a generally horizontally oriented propagation direction, polarized beam of electromagnetic radiation (LBI);
  c. causing said generally horizontally oriented propagation direction, polarized beam of electromagnetic radiation (LBI) to interact with said first optic element (PRI) and by essentially total internal reflection therein become a generally vertically oriented propagation direction, polarized beam of electromagnetic radiation (LBI') which is caused to pass through a first focusing optic (F1) and interact with a material system (MS) placed upon said material system stage (MS);
  d. causing a generally vertically oriented propagation direction, polarized beam of electromagnetic radiation (LBO') provided by said generally vertically oriented propagation direction, polarized beam of electromagnetic radiation (LBI') reflective interaction with said material system (MS) to pass through a second focusing optic (F2) and interact with a second optic element (PRO), in which second optic element (PRO) said generally vertically oriented propagation direction, polarized beam of electromagnetic radiation (LBO') is, by essentially total internal reflection, caused to become a generally horizontally oriented propagation direction, polarized beam of electromagnetic radiation (LBO);
  e. causing said generally horizontally oriented propagation direction, polarized beam of electromagnetic radiation (LBO) to pass through said analyzer (A) and said aperture (AP) and enter detector system (DET);

wherein analysis of said generally horizontally oriented propagation direction, polarized beam of electromagnetic radiation (LBO) is performed.

11. A method of investigating a material system as in claim 10 which further comprises the step of rotating the material system investigating system about at least one axis so as to place the generally horizontally oriented propagation directions of the generally horizontally oriented propagation direction, polarized beams of electromagnetic radiation (LBI) and (LBO), and/or the generally vertically oriented propagation directions of the generally vertically oriented propagation direction polarized beams of electromagnetic radiation (LBI') and (LBO'), out of alignment with an external frame of reference for generally horizontally oriented and/or generally vertically oriented direction(s).

12. A method of investigating a material system comprising the steps of:
   a. providing a material system investigating system comprising:
      a. a light source (LS);
      b. a polarizer (P);
      c. a first optic element (PRI);
      d. a first focusing optic (F1);
      e. a material system stage (STG);
      f. a second focusing optic (F2);
      g. a second optic element (PRO);
      h. an analyzer (A);
      i. a detector (DET); and
      j. optionally compensator(s) (C) (C');
   said light source (LS) and polarizer (P), serving in use to produce a generally horizontally oriented propagation direction, polarized beam of electromagnetic radiation (LBI), said generally horizontally oriented propagation direction, polarized beam of electromagnetic radiation (LBI) being caused to interact with said first optic element (PRI) and by essentially total internal reflection therein become other than a generally horizontally oriented propagation direction, polarized beam of electromagnetic radiation (LBI') which is caused to pass through said first focusing optic (F1) and interact with a material system (MS) placed upon said material system stage (STG), said interaction with said material system (MS) causing a reflected other than generally horizontally oriented propagation direction, polarized beam of electromagnetic radiation (LBO') to pass through said second focusing optic (F2) and interact with said second optic element (PRO), in which second optic element (PRO) said generally other than horizontally oriented propagation direction, polarized beam of electromagnetic radiation (LBO') is, by essentially total internal reflection, caused to become a generally horizontally oriented propagation direction, polarized beam of electromagnetic radiation (LBO), which generally horizontally oriented propagation direction, polarized beam of electromagnetic radiation then (LBO) then passes through analyzer (A) and, via an essentially circular shaped aperture (AP), enters said detector system (DET) for analysis, which generally other than horizontally oriented propagation direction, polarized beams of electromagnetic radiation (LBI') and (LBO') approach and are reflected from, respectively, said material system (MS) at essentially equal angles of incidence and reflection ( ), as viewed in frontal elevation;
   b. causing said light source (LS) and a polarizer (P), to produce a generally horizontally oriented propagation direction, polarized beam of electromagnetic radiation (LBI);
   c. causing said generally horizontally oriented propagation direction, polarized beam of electromagnetic radiation (LBI) to interact with said first optic element (PRI) and by essentially total internal reflection therein become other than a generally horizontally oriented propagation direction, polarized beam of electromagnetic radiation (LBI') which is caused to pass through a first focusing optic (F1) and interact with a material system (MS) placed upon said material system stage (MS);
   d. causing an other than generally horizontally oriented propagation direction, polarized beam of electromagnetic radiation (LBO') provided by said other than a generally horizontally oriented propagation direction, polarized beam of electromagnetic radiation (LBI') reflective interaction with said material system (MS) to pass through a second focusing optic (F2) and interact with a second optic element (PRO), in which second optic element (PRO) said generally other than horizontally oriented propagation direction, polarized beam of electromagnetic radiation (LBO') is, by essentially total internal reflection, caused to become a generally horizontally oriented propagation direction, polarized beam of electromagnetic radiation (LBO);
   e. causing said generally horizontally oriented propagation direction, polarized beam of electromagnetic radiation (LBO) to pass through said analyzer (A) and enter detector system (DET);

wherein analysis of said generally horizontally oriented propagation direction, polarized beam of electromagnetic radiation (LBO) is performed.

13. A method of investigating a material system as in claim 12 which further comprises the step of rotating the material system investigating system about at least one axis so as to place the generally horizontally oriented propagation directions of the generally horizontally oriented propagation direction, polarized beams of electromagnetic radiation (LBI) and (LBO), and/or the other than generally horizontally oriented propagation directions of the other than generally horizontally oriented propagation direction, polarized beams of electromagnetic radiation (LBI') and (LBO'), out of alignment with an external frame of reference for generally horizontally oriented and/or generally vertically oriented direction(s).

14. A material system investigating system comprising:
   a. a light source (LS);
   b. optionally a polarizer (P);
   c. a first optic element (PRI);
   d. a first focusing optic (F1);
   e. a material system stage (STG);
   f. a second focusing optic (F2);
   g. a second optic element (PRO);
   h. optionally an analyzer (A);
   i. a detector (DET); and
   j. optionally compensator(s) (C) (C'); said light source (LS) serving in use to produce a generally horizontally oriented Propagation direction, beam of electromagnetic radiation (LBI), said generally horizontally oriented propagation direction, beam of electromagnetic radiation (LBI) being caused to interact with a first optic element (PRI) and, by essentially total internal reflection therein, become other than a generally horizontally oriented propagation direction, beam of electromagnetic radiation (LBI') which is caused to pass through a first focusing optic (F1) and reflectively interact with a material system (MS) placed upon said material system stage (STG), said reflective interaction with said material system (MS) causing an other than generally horizontally oriented propagation direction, beam of electromagnetic radiation (LBO') to pass through a second focusing optic (F2) and interact with a second optic element (PRO), in which second optic element (PRO) said generally other than horizontally oriented propagation direction, beam of electromagnetic radiation (LBO') is by essentially total internal reflection caused to become a generally horizontally oriented propagation direction, beam of electromagnetic radiation (LBO), which generally horizontally oriented propagation direction, beam of electromagnetic radiation (LBO) then via an essentially circular shaped aperture (AP), enters a detector system (DET) for analysis, which generally other than horizontally oriented propagation direction, beams of electromagnetic radiation (LBI') and (LBO') approach and are reflected from, respectively, said material system (MS) at essentially equal angles of incidence and reflection ($\ominus$), as viewed in frontal elevation.

15. A material system investigating system as in claim 14 in which a polarizer (P) is present between said light source (LS) and said first optic element (PRI), and causes said generally horizontally oriented propagation direction, beam of electromagnetic radiation (LBI), to be a generally horizontally oriented propagation direction, polarized beam of electromagnetic radiation (LBI).

16. A material system investigating system as in claim 14 in which an analyzer (A) is present between said second optic element (PRO) and said detector (DET).

17. A material system investigating system as in claim 14 in which [comprises] at least one compensator (C) (C') is present at a location between said light source (LS) and said detector (DET).

18. A method of investigating a material system comprising the steps of:
   a. providing a material system investigating system comprising:
      a. a light source (LS);
      b. optionally a polarizer (P);
      c. a first optic element (PRI);
      d. a first focusing optic (F1);
      e. a material system stage (STG);
      f. a second focusing optic (F2);
      g. a second optic element (PRO);
      h. optionally an analyzer (A);
      i. a detector (DET); and
      j. optionally compensator(s) (C) (C');
   said light source (LS) serving in use to produce a generally horizontally oriented propagation direction, beam of electromagnetic radiation (LBI), said generally horizontally oriented propagation direction, beam of electromagnetic radiation (LBI) being caused to interact with a first optic element (PRI) and, by essentially total internal reflection therein, become other than a generally horizontally oriented propagation direction, beam of electromagnetic radiation (LBI') which is caused to pass through a first focusing optic (F1) and reflectively interact with a material system (MS) placed upon said material system stage (STG), said reflective interaction with said material system (MS) causing an other than generally horizontally oriented propagation direction, beam of electromagnetic radiation (LBO') to pass through a second focusing optic (F2) and interact with a second optic element (PRO), in which second optic element (PRO) said generally other than horizontally oriented propagation direction, beam of electromagnetic radiation (LBO') is by essentially total internal reflection caused to become a generally horizontally oriented propagation direction, beam of electromagnetic radiation (LBO), which generally horizontally oriented propagation direction, beam of electromagnetic radiation (LBO) then via an essentially circular shaped aperture (AP), enters a detector system (DET) for analysis, which generally other than horizontally oriented propagation direction, beams of electromagnetic radiation (LBI') and (LBO') approach and are reflected from, respectively, said material system (MS) at essentially equal angles of incidence and reflection ($\ominus$), as viewed in frontal elevation;

b. causing said light source (LS) to produce a generally horizontally oriented propagation direction, beam of electromagnetic radiation (LBI);

c. causing said generally horizontally oriented propagation direction, beam of electromagnetic radiation (LBI) to interact with said first optic element (PRI) and by essentially total internal reflection therein become other than a generally horizontally oriented propagation direction, beam of electromagnetic radiation (LBI') which is caused to pass through a first focusing optic (F1) and reflectively interact with a material system (MS) placed upon said material system stage (MS);

d. causing an other than generally horizontally oriented propagation direction, beam of electromagnetic radiation (LBO') provided by said other than a generally horizontally oriented propagation direction, beam of electromagnetic radiation (LBI') reflective interaction with said material system (MS) to pass through a second focusing optic (F2) and interact with a second optic element (PRO), in which second optic element (PRO) said generally other than horizontally oriented propagation direction, beam of electromagnetic radiation (LBO') is, by essentially total internal reflection, caused to become a generally horizontally oriented propagation direction, beam of electromagnetic radiation (LBO);

e. causing said generally horizontally oriented propagation direction, beam of electromagnetic radiation (LBO) to pass through said aperture (AP) and enter detector system (DET);

wherein analysis of said generally horizontally oriented propagation direction, beam of electromagnetic radiation (LBO) is performed.

19. A method of investigating a material system as in claim 18 which further comprises the step of rotating the material system investigating system about at least one axis so as to place the generally horizontally oriented propagation directions of the generally horizontally oriented propagation direction beams of electromagnetic radiation (LBI) and (LBO) and/or the other than generally horizontally oriented propagation directions of the other than generally horizontally oriented propagation direction beams of electromagnetic radiation (LBI') and (LBO') out of alignment with external frame of reference generally horizontally oriented and/or generally other than horizontally oriented direction(s).

* * * * *